(12) United States Patent
Imura

(10) Patent No.: US 8,490,106 B2
(45) Date of Patent: Jul. 16, 2013

(54) APPARATUS FOR DISTRIBUTING RESOURCES TO PARTITIONS IN MULTI-PROCESSOR SYSTEM

(75) Inventor: Hidekatsu Imura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 124 days.

(21) Appl. No.: 13/020,187

(22) Filed: Feb. 3, 2011

(65) Prior Publication Data

US 2011/0145831 A1 Jun. 16, 2011

Related U.S. Application Data

(63) Continuation of application No. PCT/JP2008/063977, filed on Aug. 4, 2008.

(51) Int. Cl.
*G06F 9/46* (2006.01)
*G06F 15/173* (2006.01)

(52) U.S. Cl.
USPC .......................................... 718/104; 709/226

(58) Field of Classification Search
USPC .................................. 718/100, 104; 709/226
See application file for complete search history.

(56) References Cited

U.S. PATENT DOCUMENTS

| | | | | |
|---|---|---|---|---|
| 6,691,146 B1 * | 2/2004 | Armstrong et al. | ........... | 718/100 |
| 7,143,412 B2 * | 11/2006 | Koenen | ........... | 718/102 |
| 7,472,246 B2 * | 12/2008 | Hamilton et al. | ........... | 711/170 |
| 2002/0087611 A1 | 7/2002 | Tanaka et al. | | |
| 2004/0143664 A1 | 7/2004 | Usa et al. | | |
| 2005/0222992 A1 * | 10/2005 | Kondo et al. | ........... | 707/3 |
| 2006/0075207 A1 | 4/2006 | Togawa et al. | | |
| 2007/0168635 A1 | 7/2007 | Allen et al. | | |
| 2007/0226449 A1 | 9/2007 | Akimoto | | |

FOREIGN PATENT DOCUMENTS

| | | |
|---|---|---|
| JP | 2002-202959 | 7/2002 |
| JP | 2004-199561 | 7/2004 |
| JP | 2006-3972 | 1/2006 |
| JP | 2006-127462 | 5/2006 |
| JP | 2007-193776 | 8/2007 |
| JP | 2007-257097 | 10/2007 |

OTHER PUBLICATIONS

International Search Report dated Sep. 30, 2008 for International Application No. PCT/JP2008/063977.

* cited by examiner

*Primary Examiner* — Van Nguyen
(74) *Attorney, Agent, or Firm* — Staas & Halsey LLP

(57) ABSTRACT

The invention achieves optimization of partition division by implementing resource distribution with a characteristic of a system into consideration so that the processing performance of the entire system is enhanced. To this end, a system management section in the invention calculates an optimum distribution of a plurality of resources to partitions based on distance information regarding the distance between a plurality of resources and data movement frequencies between the plural resources. The plural resources are distributed to the plural partitions through a plurality of partition management sections so that the optimum distribution state may be established.

17 Claims, 6 Drawing Sheets

FIG. 2

31a: ACCESS LATENCY TABLE (FIRST TABLE)

|    | N1  | N2  | N3  | N4  | N5  | N6  | N7  | N8  |
|----|-----|-----|-----|-----|-----|-----|-----|-----|
| N1 | 50  | 100 | 100 | 100 | 200 | 200 | 200 | 200 |
| N2 | 100 | 50  | 100 | 100 | 200 | 200 | 200 | 200 |
| N3 | 100 | 100 | 50  | 100 | 200 | 200 | 200 | 200 |
| N4 | 100 | 100 | 100 | 50  | 200 | 200 | 200 | 200 |
| N5 | 200 | 200 | 200 | 200 | 50  | 100 | 100 | 100 |
| N6 | 200 | 200 | 200 | 200 | 100 | 50  | 100 | 100 |
| N7 | 200 | 200 | 200 | 200 | 100 | 100 | 50  | 100 |
| N8 | 200 | 200 | 200 | 200 | 100 | 100 | 100 | 50  |

FIG. 3

31b: INTER-RESOURCE DATA MOVEMENT FREQUENCY TABLE (SECOND TABLE)

| #CPU | #NODE | #PART | M1 | M2 | M3 | M4 | M5 | M6 | M7 | M8 |
|---|---|---|---|---|---|---|---|---|---|---|
| C11 | 1 | 1 | 1000 | 0 | 0 | 0 | 500 | 0 | 0 | 0 |
| C12 | 1 | 1 | 2000 | 0 | 0 | 0 | 1000 | 0 | 0 | 0 |
| C13 | 1 | 1 | 2000 | 0 | 0 | 0 | 1500 | 0 | 0 | 0 |
| C14 | 1 | 1 | 1000 | 0 | 0 | 0 | 500 | 0 | 0 | 0 |
| C21 | 2 | 1 | 1000 | 0 | 0 | 0 | 500 | 0 | 0 | 0 |
| C22 | 2 | 1 | 3000 | 1000 | 0 | 0 | 1000 | 0 | 0 | 0 |
| C23 | 2 | 2 | 0 | 1000 | 0 | 0 | 0 | 0 | 0 | 0 |
| C24 | 2 | 2 | 0 | 4000 | 0 | 0 | 0 | 0 | 0 | 0 |
| . | | | | | | | | | | |
| . | | | | | | | | | | |
| C51 | 5 | 1 | 1000 | 0 | 0 | 0 | 2000 | 0 | 0 | 0 |
| C52 | 5 | 1 | 2000 | 0 | 0 | 0 | 1500 | 0 | 0 | 0 |
| C53 | 5 | – | 0 | 0 | 0 | 0 | 0 | 0 | 0 | 0 |
| C54 | 5 | – | 0 | 0 | 0 | 0 | 0 | 0 | 0 | 0 |
| C61 | 6 | 2 | 0 | 3000 | 0 | 0 | 0 | 0 | 0 | 0 |
| C62 | 6 | 2 | 0 | 2000 | 0 | 0 | 0 | 0 | 0 | 0 |
| C63 | 6 | – | 0 | 0 | 0 | 0 | 0 | 0 | 0 | 0 |
| C64 | 6 | – | 0 | 0 | 0 | 0 | 0 | 0 | 0 | 0 |
| . | | | | | | | | | | |
| . | | | | | | | | | | |

APPARATUS FOR DISTRIBUTING RESOURCES TO PARTITIONS IN MULTI-PROCESSOR SYSTEM

CROSS-REFERENCE TO RELATED APPLICATION

This application is a continuation Application of PCT international application No. PCT/JP2008/063977 filed on Aug. 4, 2008 in Japan, the entire contents of which are incorporated by reference.

FIELD

The present invention relates to a technique suitable for a computer system such as a multi-processor system that allocates and divides a plurality of resources such as CPUs (Central Processing Units; arithmetic processing sections), memories and so forth to a plurality of partitions and that executes data processing for each of the partitions using the resources belonging to the partition.

BACKGROUND

Generally, an architecture called NUMA (Non-Uniform Memory Access) is frequently adopted in a large scale multi-processor system consisting of a great number of CPUs, memories and I/Os (inputting/outputting sections). This NUMA architecture is characterized in that the respective latencies of the memories are not uniform, or in other words, a "near memory" and a "remote memory" exist. Here, the latency corresponds to response time from a memory when a CPU or the like accesses the memory, and it can be defined that a memory having a small latency is a "near memory" and a memory having a large latency is a "far memory".

Further, a large scale multi-processor system includes a great number of CPUs, memories and I/Os as resources as described above. In such a large scale multi-processor system, a partitioning technique is used wherein a great number of resources are divided (grouped) into a plurality of partitions and an independent OS (Operating System) operates in each of the partitions.

For example, Patent Documents 1 and 2 listed below each disclose a logical partition (soft partition) technique. In the logical partition techniques, a plurality of OSs are started up for respective logical partitions on a host OS (controlling host). A logical processor or the like is allocated to each logical partition, and the host OS associates the logical processor with a physical processor and causes the OSs to execute processing of the respective logical partitions. While the logical partition technique uses a virtual partition, the present invention is based on a hard partition technique wherein resources are divided and used, that is, a technique wherein a physically different resource is used for each partition.

Patent Document 1: Japanese Patent Laid-Open No. 2006-127462
Patent Document 2: Japanese Patent Laid-Open No. 2007-193776

DISCLOSURE OF INVENTION

Issues to be Solved by the Invention

In order to prevent degradation of a processing performance when partition division is to be carried out on a multi-processor system which adopts the NUMA architecture, it is desirable that the system does not have a system configuration wherein components (resources) of a partition do not extend across a plurality of nodes. Accordingly, partition division is normally carried out in units of nodes. However, changing or the like relating to addition/deletion/failure of a CPU or a memory in each partition after division may cause components of the partition to unintentionally distributed across a plurality of nodes (for example, refer to FIG. 5).

In the case where the partition configuration is inappropriate, for example, components of a partition spread across a plurality of nodes as described above, the following problem occurs. In particular, the processor (CPU) needs to access a "far memory", and the memory latency increases. Further, since memory access is carried out through a greater number of communication paths, the traffic in the entire multi-processor system unnecessarily increases. As a result, the processing performance of the entire system degrades.

Means to Solve the Issues

A multi-processor system disclosed herein has a plurality of resources, a plurality of partition management sections and a system management section. The plural resources are capable of being allocated singly to one of a plurality of partitions. The plural partition management sections manage resources individually belonging to the plural partitions. The system management section manages the plural resources and the plural partition management sections. And, the system management section includes a first table storage unit, a collection unit, a second table storage unit, a calculation unit and a distribution unit. Here, the first table storage unit stores a first table which defines distance information concerning distances between the plural resources. The collection unit collects data movement information between the plural resources. The second table storage unit stores a second table for retaining data movement frequencies between the plural resources based on the data movement information collected by the collection unit. The calculation unit calculates an optimum distribution of the plural resources to the partitions based on the distance information of the first table and the data movement frequencies of the second table. The distribution unit distributes the plural resources to the plural partitions through the plural partition management sections so that a distribution state of the plural resources to the plural partitions becomes the optimum distribution state calculated by the calculation unit.

Meanwhile, a management apparatus for a multi-processor system disclosed herein manages the plural resources and the plural partition management sections in the multi-processor system which has the plural resources and the plural partition management sections described above. And, this management apparatus includes the first table storage unit, collection unit, second table storage unit, calculation unit and distribution unit described above.

Further, a multi-processor system management. program disclosed herein causes a computer to function as a management apparatus (system management section) for managing the plural resources and the plural partition management sections in the multi-processor system which has the plural resources and the plural partition management sections described above. This program causes the computer to function as the first table storage unit, collection unit, second table storage unit, calculation unit and distribution unit described above. A computer-readable recording medium disclosed herein has the multi-processor system management program described above recorded thereon or therein.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING

FIG. 2 is a diagram illustrating an example of an access latency table (first table) of the present embodiment;

FIG. 3 is a diagram illustrating an example of an inter-resource data movement frequency table (second table) of the present embodiment;

BEST MODES FOR CARRYING OUT THE INVENTION

Hereinafter, an embodiment of the present invention will now be described with reference to the accompanying drawings.

Figure 1:
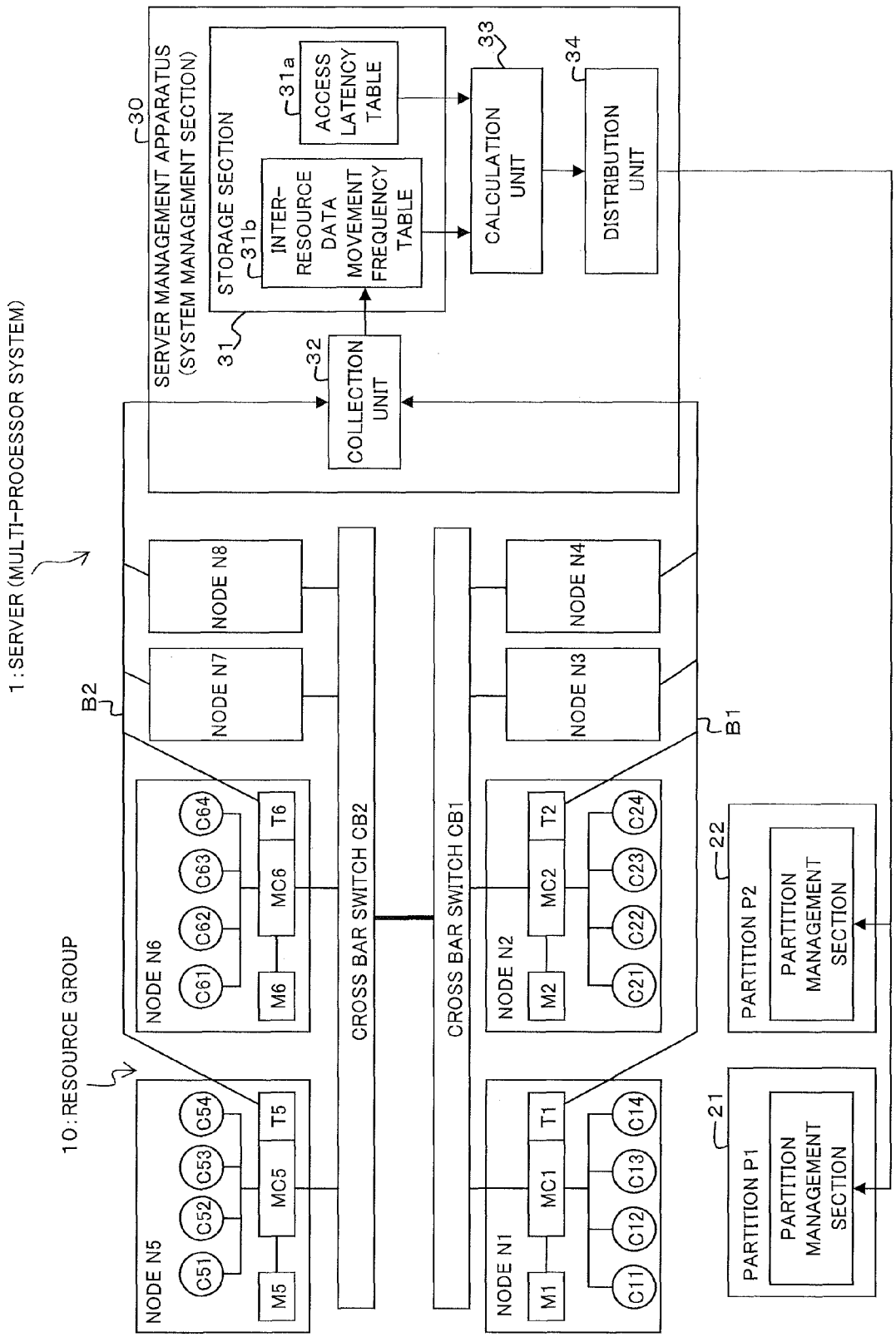
FIG. 1 is a block diagram showing a configuration of a multi-processor system according to an embodiment of the present invention.

FIG. 1 is a block diagram schematically illustrating a configuration of a multi-processor system as an embodiment of the present invention. A server 1 which is an example of the multi-processor system of the present embodiment shown in FIG. 1 allocates and divides a plurality of resources (refer to a resource group 10) such as a CPU and a memory to a plurality of partitions and uses the resources belonging to the partitions to execute data processing in units of partitions. The present embodiment assumes that two partitions P1 and P2 are set, but the number of partitions is not limited to two. Hereinafter, the multi-processor system 1 is sometimes referred to simply as "system 1".

The multi-processor system 1 of the present embodiment includes a resource group 10, partition management sections 21 and 22, and a server management apparatus 30. Here, the partition management sections 21 and 22 and the server management apparatus 30 are configured, for example, in units of boards.

The resource group 10 in the present embodiment includes a plurality of resources, such as a CPU and a memory, which can be allocated singly to one of the plural partitions of P1 and P2. More particularly, in the present embodiment, the resource group 10 includes eight nodes N1 to N8 and crossbar switches CB1 and CB2 that communicably connect the nodes N1 to N8 to each other.

Specifically, the four nodes N1 to N4 are connected to the crossbar switch CB1 and can thereby communicate with each other through the crossbar switch CB1. Similarly, the four nodes N5 to N8 are connected to the crossbar switch CB2 and can thereby communicate with each other through the crossbar switch CB2. Further, the crossbar switches CB1 and CB2 are connected to each other, and the four nodes N1 to N4 and the four nodes N5 to N8 can communicate with each other through the crossbar switches CB1 and CB2.

Each of the nodes N1 to N8 is a set of resources into which a plurality of resources in the system 1 are divided depending upon the physical disposition thereof. Each resource belongs to one of the nodes. For example, each node Ni (i=1 to 8) includes four CPUs Ci1 to Ci4, one memory Mi, one memory controller MCi, and one data movement information collecting table Ti.

Here, an example of the one memory Mi is a combination of a plurality of DIMMs (Double Inline Memory Modules). Meanwhile, the memory controller MCi has a function of controlling data movement between the CPUs Ci1 to Ci4, memory Mi and crossbar switch CB1 (or CB2). Further, the memory controller MCi has a function of recording, when a read request for the memory Mi is received, data movement information regarding from which CPU the request is issued into the table Ti. Such data movement information recorded in the tables Ti is collected by a correction unit 32 of the server management apparatus 30 through an inter-resource data movement information collecting bus B1 or B2 as described below.

Figure 5:
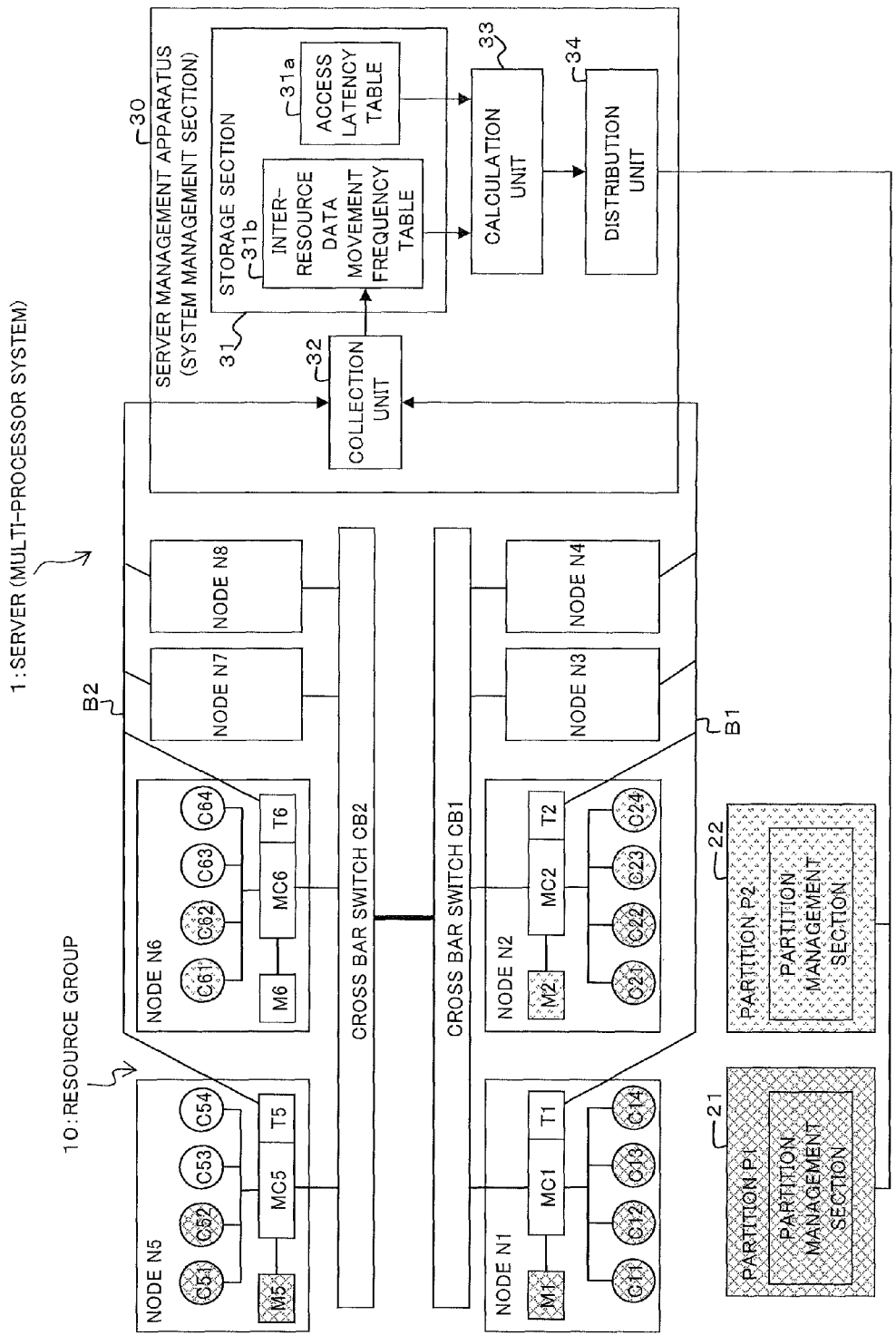
FIG. 5 is a diagram illustrating a state before optimization of the multi-processor system shown in FIG. 1, explaining a particular, example of optimization operation of partition division in the system.
Figure 6:
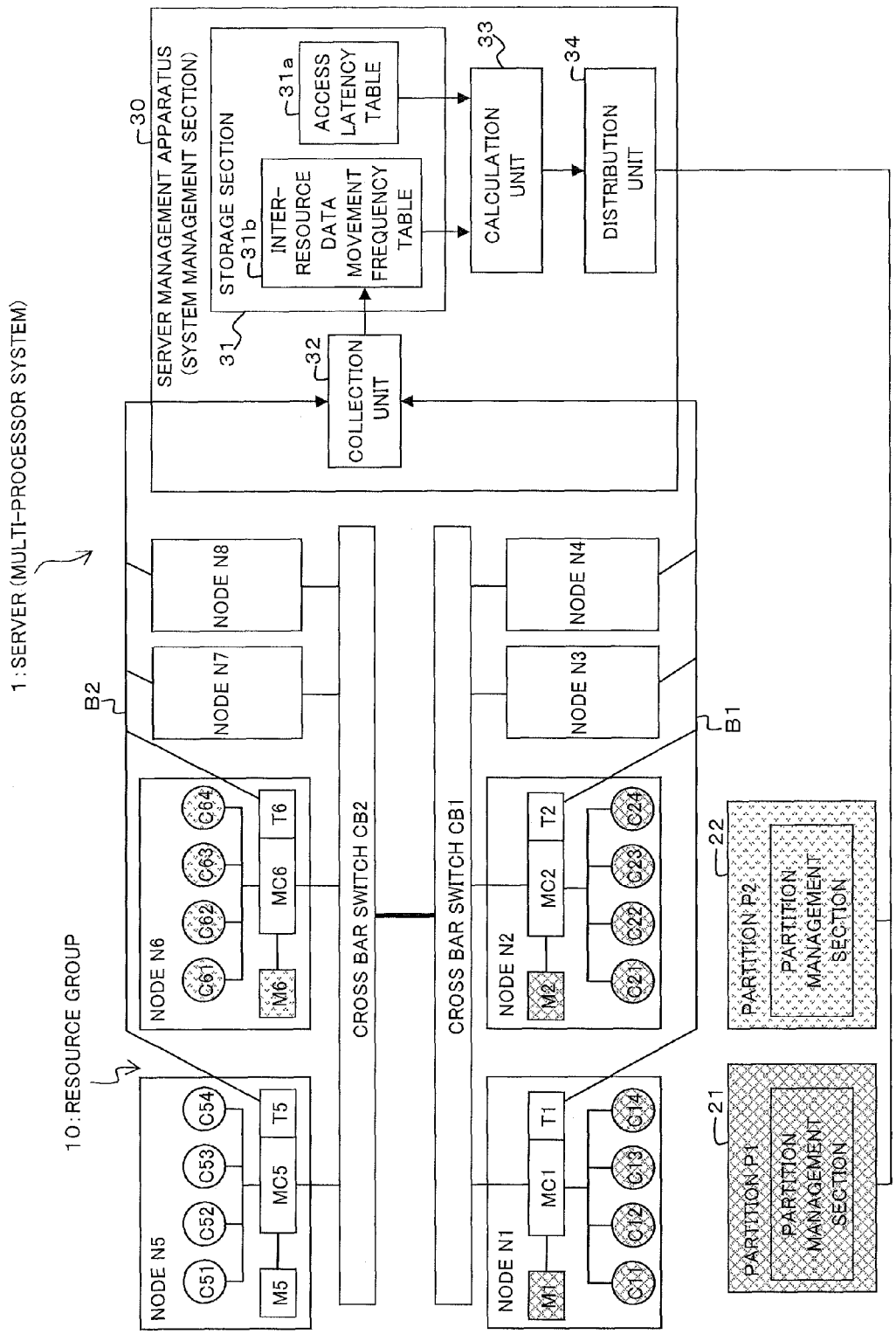
FIG. 6 is a diagram illustrating a state after the optimization of the multi-processor system shown in FIG. 1, explaining a particular example of optimization operation of partition division in the system.

In FIGS. 1, 5 and 6, the CPUs 11 to 14, C21 to C24, C51 to C54 and C61 to C64; memories M1, M2, M5 and M6; memory controllers MC1, MC2, MC5 and MC6; and tables T1, T2, T5 and T6 in the nodes N1, N2, N5 and N6, respectively, are illustrated. Meanwhile, the CPUs C31 to C34, C41 to C44, C71 to C74 and C81 to C84; memories M3, M4, M7 and M8; memory controllers MC3, MC4, MC7 and MC8; and tables T3, T4, T7 and T8 in the nodes N3, N4, N7 and N8, respectively, are omitted.

Further, although some hardware structure does not allow a combination of a CPU and a memory to separate from each other, the CPU from the memory, the description herein assumes that all the combinations of a CPU and a memory can separate from each other. It is to be noted, however, that the present invention is not limited in regard to whether it is possible or impossible to separate a CPU and a memory from each other.

Further, although it is described that, in the system 1 shown in FIGS. 1, 5 and 6, the number of nodes is 8 and the number of crossbar switches is 2 while the number of CPUs is 4 and the number of memories is 1 in each node Ni, the present invention is not limited by the specific numbers.

The partition management sections 21 and 22 are provided correspondingly to the partitions P1 and P2, respectively, and manage such resources as the CPUs and the memories that belong to the partitions P1 and P2, respectively. Further, the partition management sections 21 and 22 recognize the resources belonging to the respective partitions P1 and P2 on the basis of condition tables regarding the partitions P1 and P2. In accordance with the result of the recognition, the partition management sections 21 and 22 allocate, divide, and distribute a plurality of resources to the partitions P1 and P2 and manage the resources belonging to the partitions P1 and P2, respectively. The condition tables in the partition management sections 21 and 22 are indicated and set by the server management apparatus 30.

The server management apparatus (multi-processor system management apparatus, system management section) 30 manages the plural resources represented as the resource group 10 and the plural partition management sections 21 and 22 and includes a storage section 31, a correction unit 32, a calculation unit 33 and a distribution unit 34.

The storage section 31 is formed of, for example, a RAM (Random Access Memory) and functions as a first table storage unit that stores an access latency table 31a as a first table and a second table storage unit that stores an inter-resource data movement frequency table 31b as a second table.

Here, the access latency table (inter-node distance table) 31a defines distance information regarding the distances between a plurality of resources belonging to the resource group 10 of the system 1 of FIG. 1. As illustrated in FIG. 2, in this access latency table 31a, a distance between nodes that the respective resources belong to, more particularly, actual access latency (access waiting time; unit:nsec) between nodes is defined as the distance information.

The distance information defined in this access latency table 31a, that is, the access latency, is acquired in advance as a performance of the system 1 or of the resource group 10 included in the system 1 by a performance test, and is given in advance and registered into the access latency table 31a of the storage section 31.

Here, FIG. 2 is a diagram illustrating an example of the access latency table 31a in the present embodiment.

For example, in the access latency table 31a illustrated in FIG. 2, the distance between the node Ni and the node N2 is defined as 100 nsec, and the distance between the node N3 and the node N8 is defined as 200 nsec. The values in the access latency table 31a as the first table are not limited to values of access latency or values proportional to the access latency. Also it is possible to use, as the values in the access latency table 31a, values related to the distance between resources, such as, values weighted by a throughput of a communication path along which data passes in addition to actual access latency only.

In the following description, the distance between the node Ni and the node Nj defined by the access latency table 31a, or in other words, the access latency, is described, as distance(i, j), in the following manner:

distance(i,j)=50 (i=j)
100 (i≦4 and j≦4 and i≠j) or (5≦i and 5≦j and i≠j)
200 (in any other case)

The inter-resource data movement frequency table 31b retains data movement frequencies between a plurality of resources based on data movement information collected by the correction unit 32.

Here, the correction unit 32 receives and collects data movement information recorded in the tables Ti of the nodes Ni by the memory controllers MCi from the tables Ti through the buses B1 and B2. The data movement information is information representative of from which CPU a read request for the memory Mi is received as described hereinabove.

Further, the correction unit 32 has an additional function of integrating the data movement information received from the tables Ti by registering the data movement information into the inter-resource data movement frequency table 31b. Consequently, in the inter-resource data movement frequency table 31b, information regarding from which CPU to which memory how many times a read request has been issued, for example, a communication time number/data movement time number/read access time number, is registered as a data movement frequency.

Although read requests is counted here, data movement information regarding a write request, that is, regarding a request for writing into a memory, from a CPU, may alternatively be collected by the memory controller MCi or the table Ti. In this instance, information regarding from which CPU to which memory how many times a write request has been issued, or in other words, a communication time number/data movement time number/read access time number, is registered as a data movement frequency into the inter-resource data movement frequency table 31b. Further alternatively, only the data movement time number regarding a read request may be counted as a data movement frequency or only the data movement time number regarding a write request may be counted as a data movement frequency, or the sum of the data movement time numbers regarding both of a read request and a write request may be counted as a data movement frequency.

In this manner, in the present embodiment, a collection unit that collects data movement information between a plurality of resources is formed of the memory controllers MCi, the tables Ti, the buses B1 and B2, the inter-resource data movement frequency table 31b, and the correction unit 32. When communication is carried out between resources such as a CPU and a memory, the collection unit identifies from where to where data movement has been carried out and records the identified information as a data movement frequency into the inter-resource data movement frequency table 31b.

Here, FIG. 3 is a diagram illustrating an example of the inter-resource data movement frequency table 31b of the present embodiment. In the inter-resource data movement frequency table 31b illustrated in FIG. 3, a particular example of the numbers of times of access of the CPUs to the memories is recorded. It can be recognized from the inter-resource data movement frequency table 31b that, for example, the CPU C11 has made an access to the memory M1 1,000 times and has made an access to the memory M5 500 times. Further, it can be recognized that, for example, the CPU C23 has accessed the memory M2 1000 times.

In the inter-resource data movement frequency table 31b illustrated in FIG. 3, the node number i to which each CPU belongs is entered in the #NODE column, and the partition number to which each CPU belongs is entered in the #PART column. Here, similarly as in an example hereinafter described with reference to FIG. 5, the eight CPUs C11, C12, C13, C14, C21, C22, C51 and C52 and the two memories M1 and M5 belong to the partition P1, and the four CPUs C23, C24, C61 and C62 and the one memory M2 belong to the partition P2.

In the following description, the data movement time number (access time number) between the CPU Cik (i=1 to 8, k=1 to 4) and the memory Mn (n=1 to 8) registered in the inter-resource data movement frequency table 31b is represented as F(Cik, Mn). For example, the registered data movement time number F(C13, M5) between the CPU C13 and the memory M5 is F(C13, M5)=1,500.

Further, if the distance between the CPU Cik and the memory Mn, that is, the inter-node distance or access latency between the CPU Cik and the memory Mn, is represented by D(Cik, Mn), D(Cik, Mn)=distance(node ID number i of the node to which the CPU belongs, node ID number n of the node to which the memory belongs)=distance(i, n) is established. For example, the distance between the CPU C61 and the memory M2 is D(C61, M2)=distance(6, 2), and if the access latency table 31a illustrated in FIG. 2 is referred to, the distance is 200.

The calculation unit 33 calculates an optimum distribution of the plural resources to the partitions P1 and P2 based on the distance information (access latencies/memory latencies) of the access latency table 31a and the data movement frequency of the inter-resource data movement frequency table 31b.

For this purposes, the calculation unit 33 first calculates an average distance regarding all combinations of a plurality of resources allocated to the partitions P1 and P2, that is, an average memory latency, based on the distance information of the access latency table 31a and the data movement frequencies of the inter-resource data movement frequency table 31b.

In other words, the calculation unit 33 calculates, for each of the combinations described hereinabove, the sum total of products of the access time numbers F(Cik, Mn) of the CPUs Cik to the memories Mn recorded as the data movement frequencies in the inter-resource data movement frequency table 31b and the corresponding memory latency defined as the distance information in the access latency table 31a, that is, the inter-node access latency D(Cik, Mn)=distance (i, n). Then, the calculation unit 33 divides the sum total of the products by the sum total of the access time numbers and thereby obtains an average value regarding the relevant combination. Then, the calculation unit 33 selects a combination of resources calculated average distance of which is the minimum from among all combinations of the plural resources as an optimum distribution.

Here, it is assumed that eight CPUs and two memories are allocated to the partition P1 and four CPUs and one memory are allocated to the partition P2 as described above. With this configuration, for example, in regard to the partition P2, in selection of four CPUs and one memory from among 32 CPUs and eight memories of the nodes N1 to N8 and allocation the selected CPUs and memory to the partition P2, a large number of combinations are available. The calculation unit 33 calculates an average distance, that is, average memory latency, of each possible combination based on the data of the access latency table 31a and the inter-resource data movement frequency table 31b in the following manner.

Here, for the sake of simplification, description will now be made a case in which average memory latency of the partition P2 to which the four CPUs C23, C24, C61 and C62 and the one memory M2 are allocated as depicted in FIG. 5 is calculated based on the data of the access latency table 31a and the inter-resource data movement frequency table 31b illustrated in FIGS. 2 and 3, respectively.

First, the total number of memory access time numbers in the partition P2 is calculated based on the numerical values recorded in the inter-resource data movement frequency table 31b illustrated in FIG. 3 as:

$$F(C23, M2) + F(C24, M2) + F(C61, M2) + F(C62, M2) = 1000 + 4000 + 3000 + 2000$$
$$= 10000$$

Accordingly, the average memory latency of the resource combination illustrated in FIG. 5 in the partition P2 is calculated based on the memory latencies recorded in the access latency table 31a illustrated in FIG. 3 and the access time numbers recorded in the inter-resource data movement frequency table 31b illustrated in FIG. 3.

$$\begin{aligned}[\text{average memory latency of the partition } P2 \text{ shown in } FIG.\ 5] &= \Sigma' D(C, M) * F(C, M)/10000 \\ &= \{D(C23, M2) * F(C23, M2) + \\ &\quad D(C24, M2) * F(C24, M2) + \\ &\quad C(C61, M2) * F(C61, M2) + \\ &\quad D(C62, M2) * F(C62, M2)\}/10000 \\ &= (50*1000 + 50*4000 + 200* \\ &\quad 3000 + 200*2000)/10000 \\ &= 1250000/10000 \\ &= 125\ \text{nsec}\end{aligned}$$

wherein the symbol Σ' signifies the sum total of D(C, M)*F(C, M) calculated with regard to all combinations of the CPUs and the memories that belong to the partition P2.

On the other hand, in the case where the CPUs C23 and C24 and the memory M2 in FIG. 5 among the resources allocated to the partition P2 are respectively replaced by CPUs C63 and C64 and a memory M6 as illustrated in FIG. 6, the average memory latency is calculated in the following manner. At this time, the access time numbers of the CPUs C63 and C64 to the memory M6 are assumed to be equal to those of the CPUs C23 and C24 to the memory M2, respectively. In particular, $$F(C63, M6) = F(C23, M2) = 1000$$

$$F(C64, M6) = F(C24, M2) = 4000$$

and the average memory latency of the partition P2 illustrated in FIG. 6 is calculated in the following manner.

$$\begin{aligned}[\text{average memory latency of the partition } P2 \text{ shown in } FIG.\ 6] &= \Sigma' D(C, M) * F(C, M)/10000 \\ &= \{D(C63, M6) * F(C63, M6) + \\ &\quad D(C64, M6) * F(C64, M6) + \\ &\quad C(C61, M6) * F(C61, M6) + \\ &\quad D(C62, M6) * F(C62, M6)\}/10000 \\ &= (50*1000 + 50*4000 + 50* \\ &\quad 3000 + 50*2000)/10000 \\ &= 500000/10000 \\ &= 50\ \text{nsec}\end{aligned}$$

The average memory latency of the partition P2 illustrated in FIG. 6 decreases to 40% (=50/125) of the average memory latency of the partition P2 illustrated in FIG. 6, and significant improvement in performance of the system 1 is expected.

The calculation unit 33 calculates an average distance with regard to all combinations of the resources and obtains a resource combination which minimizes the average distance as an optimum partition configuration (optimum distribution) in such a manner as described above.

Gnerally, the calculation unit 33 calculates, with regard to τ:{set of CPUs}→{set of CPUs}, ρ:{set of memories}→{set of memories}, average distance AvgD(τ,ρ)=Σ"D(Σ(C),ρ(M))*F(C, M)/1000 and calculates τ and ρ which minimize the average distance. The τ (set of CPUs of partition P2) and ρ (set of memories of partition P2) obtained as a result of the calculation is an optimum resource configuration (resource distribution) of the partition P2 which minimizes the average latency. The symbol Σ' also signifies the sum total of D(τ(C), ρ(M))*F(C, M) calculated with regard to all combinations of the CPUs and the memories which belong to the partition P2.

The resources which belong to one of the partition P1 and the partition P2 do not belong to the other partition. Accordingly, actually the calculation unit 33 successively selects the combinations of the 12 CPUs and the three memories which belong to each of the partition P1 and the partition P2, calculates average memory latency of each of the combinations in a similar manner as described above to each of the combinations, and selects an optimum distribution, that is, a resource combination which exhibits a minimum average distance based on the average distances.

The distribution unit 34 is configured to distribute the CPUs Cik and the memories Mn to the partitions P1 and P2 through the partition management sections 21 and 22 such that the resource distribution states to the partitions P1 and P2 come to be in the state of the optimum distribution calculated by the calculation unit 33. At this time, the distribution unit 34 notifies the partition management sections 21 and 22 of information regarding the optimum distribution so that the contents of the condition tables regarding the partitions P1 and P2 in the partition management sections 21 and 22 are changed by rewriting. Here, the information regarding the optimum distribution conveyed from the distribution unit 34 to the partition management sections 21 and 22 is information which designates the CPUs Cik and the memories Mn that are to be included in the partitions P1 and P2.

The distribution changing process by the distribution unit 34 is executed after the power supply to the board which includes the node to which the changing object resource belongs is stopped within a time range within which the frequency of the use of the system 1 is low such as midnight. In the distribution changing process, rewriting of the condition tables of the partition management sections 21 and 22 is carried out and a process of moving internal data of the CPU or stored data of the memory of an object of changing is executed. Consequently, the configuration of resources in the partitions P1 and P2 is changed to an optimum partition configuration. However, the present invention is not limited to such a distribution changing process, but a distribution changing process may alternatively be carried out by active exchange of the board or the like.

The resource distribution change by the distribution unit 34 is executed if a partition configuration having an average distance smaller than the average distance in the current partition configuration exists. In particular, the resource distribution change is executed if the partition configuration after the distribution change achieves improvement in performance higher by a predetermined reference value than that of the current partition configuration, i.e., that before the distribution change. More particularly, preferably the resource distribution change is executed in the case where the performance improvement rate [average distance after distribution change]/[average distance before distribution change] calculated in the above manner is equal to or lower than a predetermined value.

The processes by the calculation unit 33 and the distribution unit 34 described above are executed within a time range within which the frequency of the use of the system 1 is low such as midnight in response to trigger such as addition of a new partition, lapse of a predetermined period of time, a request from a user (server managing person) or the like.

Further, in the case where a plurality of resource combinations that are capable of achieving an optimum distribution are present, the calculation unit 33 preferably selects one of the resource combinations which needs a minimum amount of resource distribution changing when resource distribution by the distribution unit 34 hereinafter described is to be carried out. By such selection, such processing as rewriting change of the condition tables in the partition management sections 21 and 22 or data movement between a CPU and a memory upon resource distribution change can be suppressed to the minimum, and distribution change can be carried out efficiently.

Now, operation of the system 1 (server management apparatus 30) of the present embodiment configured in such a manner as described above is described with reference to a flow chart (steps S1 to S8) illustrated in FIG. 4 and with reference to FIGS. 5 and 6. Both FIGS. 5 and 6 illustrate an example of particular optimization operation in partition division in the system 1 illustrated in FIG. 1, and FIG. 5 is a view illustrating a state before the optimization of the system 1 and FIG. 6 is a view illustrating a state after the optimization of the system 1.

Here, even if the partitions use a same quantity of resources, the performance of the system 1 differs significantly, depending upon the combinations of the resources in the partitions P1 and P2. Therefore, in the present embodiment, the resources are re-distributed to the partitions P1 and P2 to optimize the processing performance of the system 1.

In the example illustrated in FIG. 5, the eight CPUS CP11, CP12, CP13, CP14, CP21, CP22, CP51 and CP52 and the two memories M1 and M5 belong to the partition P1 while the four CPUs C23, C24, C61 and C62 and the one memory M2 belong to the partition P2. In other words, the CPUs belonging to the partition P1 are disposed dispersedly in the three nodes N1, N2 and N5 and the memories M1 and M5 belonging to the partition P1 are disposed dispersedly in the two nodes N1 and N5. Meanwhile, the CPUs belonging to the partition P2 are disposed dispersedly in the two nodes N2 and N6. In the case where the CPUs and the memories in the same partition are disposed dispersedly in different nodes likewise the above, it is necessary to carry out inter-node communication and the memory latency is deteriorated. For example, it is necessary for the CPU C61 belonging to the node N6 to access to the memory M2 of the other node N2, resulting in deterioration of the memory latency.

Figure 4:
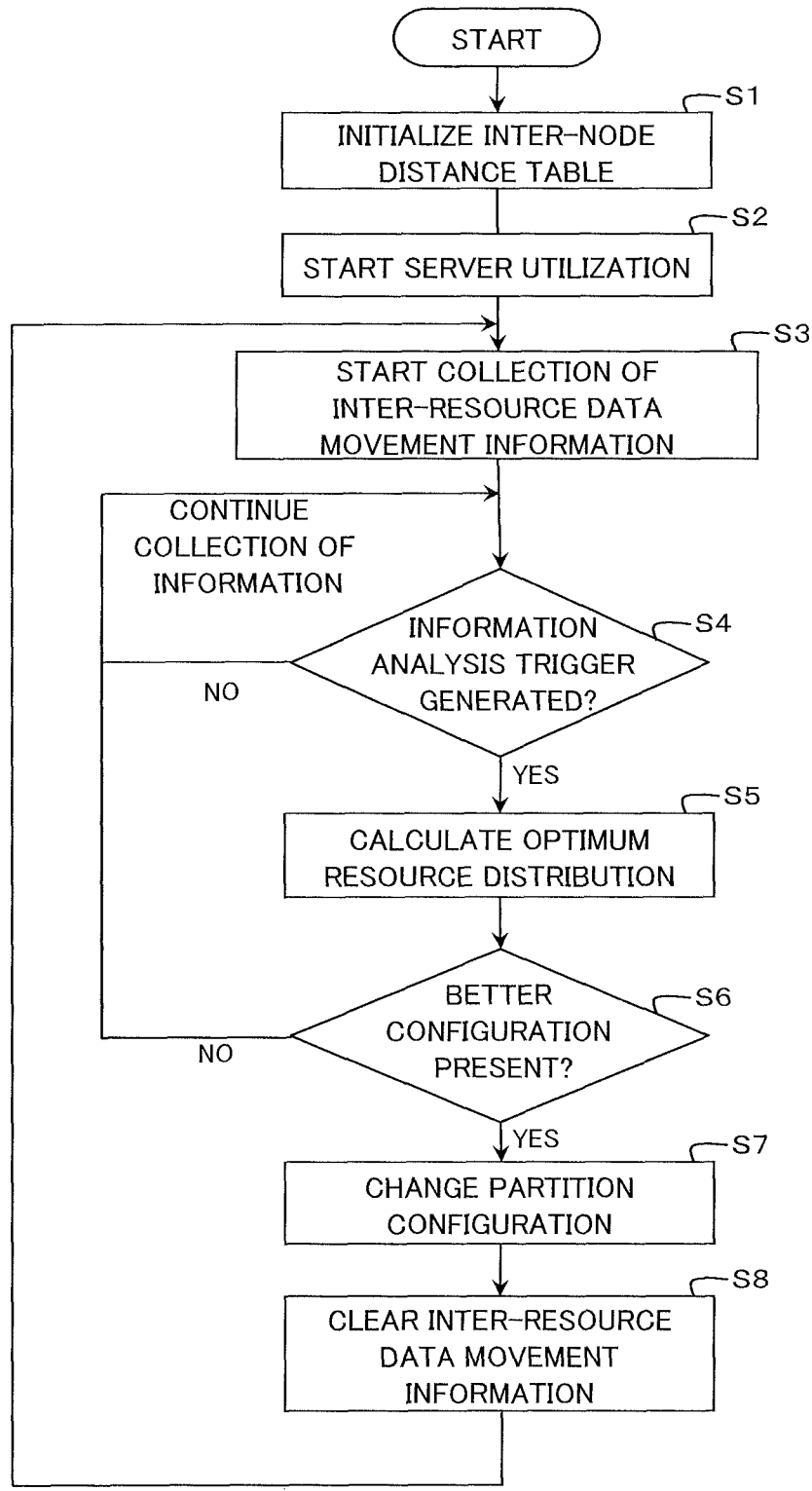
FIG. 4 is a flow chart illustrating operation of the multi-processor system management apparatus illustrated in FIG. 1.

In contrast, the example illustrated in FIG. 6 exhibits a state after optimization obtained as a result of an optimization process carried out on the resources distributed in such a manner as illustrated in FIG. 5 along a procedure illustrated in FIG. 4 by the server management apparatus 30 using, for example, the access latency table 31a and the inter-resource data movement frequency table 31b illustrated in FIGS. 2 and 3. In this example illustrated in FIG. 6, the eight CPUs C11, C12, C13, C14, C21, C22, C23 and C24 and the two memories M1 and M2 belong to the partition P1 while the four CPUs C61, C62, C63 and C64 and the one memory M6 belong to the partition P2.

By carrying out the re-distribution in this manner, the CPUs and the memory belonging to the partition P2 are disposed in the one node N6. Accordingly, when the CPUs are to carry out memory access, they always access the memory M6 in the same node N6, and consequently the memory latency is minimized.

Meanwhile, the CPUs and the memories belonging to the partition P1 are disposed in the two nodes N1 and N2 accommodated in the same crossbar switch CB1. Accordingly, also in this case, when the CPUs are to carry out memory access, they access a memory in the same node or a memory of the other node accommodated in the same crossbar switch CB1, so that the memory latency can be minimized.

After the server management apparatus 30 of the present embodiment starts operation, it first initializes the access latency table 31a (step S1) and then starts operation of the system 1 (step S2) as illustrated in FIG. 4. In the initialization of the access latency table 31a, the access latency table 31a corresponding to the resource group 10 of the present system 1 is registered into and stored in the storage section 31. Further, upon initialization at the start of operation, also initialization (clear) of the table Ti of each node Ni is carried out.

Thereafter, collection of data movement information between resources is started by the correction unit 32 (step S3). In this collection process, data movement information recorded in the tables Ti of the nodes Ni is collected from the nodes Ni through the buses B1 and B2 and registered into the inter-resource data movement frequency table 31b. Consequently, into the inter-resource data movement frequency table 31*b*, information regarding from which CPU to which memory how many times a request has been issued in the resource group 10, that is, communication time number/data movement time number/read access time number and so forth, is registered as a data movement frequency. Such collection of data movement information between the resources as described above is continued until after a trigger for information analysis is generated (NO route at step S4).

Then, after some trigger such as, for example, addition of a new partition, lapse of a predetermined period of time or a request of a user (server managing person) is generated (YES route at step S4), the calculation unit 33 calculates an optimum distribution of the resources to the partitions P1 and P2 based on the distance information of the access latency table 31*a*, that is, the access latency/memory latency, and the data movement frequencies of the inter-resource data movement frequency table 31*b* (step S5). In other words, the calculation unit 33 calculates average distances of all combinations of the resources and determines that one of the resource combinations which minimizes the average distance to be an optimum partition configuration (optimum distribution).

Thereafter, the server management apparatus 30 calculates the above a performance improvement rate [average distance after distribution change]/[average distance before distribution change] with regard to the optimum partition configuration (optimum configuration) obtained by the calculation unit 33. Then, determination is made as to whether or not the performance improvement rate is equal to or lower than a predetermined value (step S6).

If the performance improvement rate is higher than the predetermined value, the server management apparatus 30 determines that a partition configuration which is better than the current partition configuration does not exist (NO route at step S6), and the current partition configuration is maintained. In other words, the server management apparatus 30 continues the collection of data movement information between the resources and advances the processing to the process at step S4.

On the other hand, if the performance improvement rate is equal to or lower than the predetermined value, the server management apparatus 30 determines that a partition configuration which is better than the current partition configuration exists (YES route at step S6), and a distribution changing process by the distribution unit 34 is executed (step S7).

Thereupon, for example, if the distribution change is to be carried out from the partition configuration illustrated in FIG. 5 to the partition configuration illustrated in FIG. 6, the operation of the nodes N1, N2, N5 and N6 that are to be changed is stopped. Then, the distribution unit 34 rewrites the contents of the condition tables regarding the partitions P1 and P2 in the partition management sections 21 and 22 and moves the internal data of the CPUs and the stored data of the memories of the object of the change to the CPUs and the memories after the change. At this time, the stored data of the memory M2 are moved to the memory M6 and the internal data of the CPUs C23 and C24 are moved to the CPUs C63 and C64. Thereafter, the stored data of the memory M5 are moved to the memory M2 and the internal data of the CPUs C51 and C52 are moved to the CPUs C23 and C24. After such data movement processes are carried out, the power supply to the nodes N, N2, N5 and N6 is turned on, and the configurations of the resources in the partitions P1 and P2 are changed to the optimum partition configuration (optimum distribution).

After the change of the partition configuration comes to an end, such information as the data movement frequencies and the data movement information regarding the resources which have been an object of the change is cleared in the inter-resource data movement frequency table 31*b* and the tables T1, T2, T5 and T6 (step S8), and then the server management apparatus 30 advances its processing to the process at step S3.

As the above, according to the system 1 and the server management apparatus 30 as the embodiment of the present invention, an optimum distribution of the resources to the partitions is calculated statistically based on distance information and data movement frequencies between the resources in the multi-processor system 1, and resource distribution in accordance with the optimum distribution is carried out. Consequently, resource distribution considering a characteristic of the system 1 is implemented, and partition division, that is, allocation of the resources to the partitions, is optimized and the processing performance of the entire system is improved significantly. In short, by carrying out re-disposition of the resources taking the NUMA characteristic of the system 1 into consideration, the processing performance in the case where the same resources are used can be maximized.

The present invention is not limited to the embodiment described above, but the present invention can be carried out in various modified forms without departing from the subject matter of the present invention.

Further, the functions as the storage section (first table storage unit, second table storage unit) 31, correction unit 32, calculation unit 33 and distribution unit 34 (all or some of the functions of the units) are implemented by a computer (including a CPU, an information processing apparatus and various terminals) executing a predetermined application program (multi-processor system management program).

The program is provided in the form in which it is recorded in or on a computer-readable recording medium such as, for example, a flexible disk, a CD (CD-ROM, CD-R, CD-RW or the like) or a DVD (DVD-ROM, DVD-RAM, DVD-R, DVD-RW, DVD+R, DVD+WR, blu-ray disk or the like). In this instance, a computer reads the multi-processor system management program from the recording medium, transfers the program to the storage apparatus or an external storage apparatus so as to be stored and then uses the program. Alternatively, the program may be recorded into a storage apparatus (storage medium) such as, for example, a magnetic disk, an optical disk or a magneto-optical disk in advance such that it is provided from the storage apparatus to the computer through a communication line.

Here, the computer is a concept including hardware and an OS (operating system) and signifies hardware which operates under the control of the OS. Further, in such a case that the OS is not required and the hardware is operated solely by the application program, the hardware itself corresponds to the computer. The hardware includes at least a microprocessor such as a CPU, and a unit that reads the program recorded on the recording medium. The application program as the dispersed type storage system controlling program described above includes program codes for causing such a computer as described above to implement functions as the units 31 to 34. Further, some of the functions may be implemented not by the application program but by the OS.

Further, as the recording medium in the present embodiment, various computer-readable media such as IC cards, ROM cards, magnetic tapes, punched cards, internal storage apparatus (memory such as a RAM or a ROM) of a computer, external storage apparatus, and printed matters on which codes such as barcodes are printed can be utilized in addition to the flexible disks, CDs, DVDs, magnetic disks, optical disks and magneto-optical disks described above.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments have been described in detail, it should be understood that the various changes, substitutions, and alterations could be made hereto without departing from the spirit and scope of the invention.

What is claimed is:

1. A multi-processor system, comprising:
    a plurality of resources capable of being allocated singly to one of a plurality of partitions;
    a plurality of partition management sections that manage resources individually belonging to the plurality of partitions; and
    a processor that manages the plurality of resources and the plurality of partition management sections, the processor executing a process including:
        storing a first table which defines distance information concerning distances between the plurality of resources;
        collecting data movement information between the plurality of resources;
        storing a second table for retaining data movement frequencies between the plurality of resources based on the data movement information collected;
        first calculating an optimum distribution of the plurality of resources to the partitions based on the distance information of the first table and the data movement frequencies of the second table; and
        distributing the plurality of resources to the plurality of partitions through said plurality of partition management sections so that a distribution state of the plurality of resources to the plural partitions becomes the optimum distribution state calculated.

2. The multi-processor system according to claim 1, wherein, as the distance information in the first table, access latency between nodes to which said resources belong is defined.

3. The multi-processor system according to claim 1, wherein, as each of the data movement frequencies in the second table, a number of times of data movement between the plurality of resources is recorded and updated.

4. The multi-processor system according to claim 3, wherein a plurality of arithmetic processing sections and a plurality of memories are included as the plurality of resources and a number of times of communication between said arithmetic processing sections and said memories is recorded and updated as the number of times of data movement.

5. The multi-processor system according to claim 1, wherein the processor further executes a process including:
    second calculating, upon the first calculating, an average distance regarding all of combinations of the plurality of resources allocated to the partitions based on the distance information of the first table and the data movement frequencies of the second table, and
    first selecting, upon the first calculating, a combination of selected resources whose average distance is shortest as the optimum distribution.

6. The multi-processor system according to claim 5, wherein, where a plurality of combinations exist as the optimum distribution, the processor further executes a process including second selecting, upon the first selecting, as the optimum distribution, a combination whose distribution changing amount is smallest when resource distribution by the distributing is carried out.

7. The multi-processor system according to claim 5,
    wherein a plurality of arithmetic processing sections and a plurality of memories are included as the plurality of resources; and
    wherein the processor further executes a process including:
        third calculating, upon the second calculating, for each of the combinations, a sum total of products between numbers of times of accessing of said arithmetic processing sections to said memories which are recorded as the data movement frequencies in the second table and corresponding memory latency defined as the distance information in the first table, and
        fourth calculating, upon the second calculating, a value obtained by dividing the sum total of the products by a sum total of the numbers of times of accessing as the average distance regarding the relevant combination.

8. A management apparatus for a multi-processor system, which includes a plurality of resources capable of being allocated singly to one of a plurality of partitions and a plurality of partition management sections for managing the resources individually belonging to the plurality of partitions, the management apparatus comprising:
    a processor that manages resources and the plurality of partition management sections, the processor executing a process including:
        storing a first table which defines distance information concerning distances between the plurality of resources;
        collecting data movement information between the plurality of resources;
        storing a second table for retaining data movement frequencies between the plurality of resources based on the data movement information collected;
        first calculating an optimum distribution of the plurality of resources to the partitions based on the distance information of the first table and the data movement frequencies of the second table; and
        distributing the plurality of resources to the plurality of partitions through said plurality of partition management sections so that a distribution state of the plurality of resources to the plural partitions becomes the optimum distribution state calculated.

9. The management apparatus for a multi-processor system according to claim 8, wherein, as the distance information in the first table, access latency between nodes to which said resources belong is defined.

10. The management apparatus for a multi-processor system according to claim 8, wherein, as each of the data movement frequencies in the second table, a number of times of data movement between the plurality of resources is recorded and updated.

11. The management apparatus for a multi-processor system according to claim 10, wherein a plurality of arithmetic processing sections and a plurality of memories are included as the plurality of resources and a number of times of communication between said arithmetic processing sections and said memories is recorded and updated as the number of times of data movement.

12. The management apparatus for a multi-processor system according to claim 8, wherein the processor further executes a process including:
    second calculating, upon the first calculating, an average distance regarding all of combinations of the plurality of resources allocated to the partitions based on the distance information of the first table and the data movement frequencies of the second table, and first selecting, upon the first calculating, a combination of those resources whose average distance is shortest as the optimum distribution.

13. The management apparatus for a multi-processor system according to claim 12, wherein, where a plurality of combinations exist as the optimum distribution, the processor further executes a process including second selecting, upon the first selecting, as the optimum distribution, a combination whose distribution changing amount is smallest when resource distribution by the distributing is carried out.

14. The management apparatus for a multi-processor system according to claim 12, wherein a plurality of arithmetic processing sections and a plurality of memories are included as the plurality of resources; and wherein the processor further executes a process including:

third calculating, upon the second calculating, for each of the combinations, a sum total of products between numbers of times of accessing of said arithmetic processing sections to said memories which are recorded as the data movement frequencies in the second table and corresponding memory latency defined as the distance information in the first table, and fourth calculating, upon the second calculating, a value obtained by dividing the sum total of the products by a sum total of the numbers of times of accessing as the average distance regarding the relevant combination.

15. A non-transitory computer-readable recording medium on or in which a multi-processor system management program is recorded, the program causing a computer to function as a management apparatus for a multi-processor system, which includes a plurality of resources capable of being allocated singly to one of a plurality of partitions and a plurality of partition management sections for managing the resources individually belonging to the plurality of partitions, for managing the plurality of resources and the plurality of partition management sections, the program causing the computer to function as:

a first table storage unit that stores a first table which defines distance information concerning distances between the plurality of resources;

a collection unit that collects data movement information between the plurality of resources;

a second table storage unit that stores a second table for retaining data movement frequencies between the plurality of resources based on the data movement information collected by said collection unit;

a calculation unit that calculates an optimum distribution of the plurality of resources to the partitions based on the distance information of the first table and the data movement frequencies of the second table; and a distribution unit that distributes the plurality of resources to the plurality of partitions through said plurality of partition management sections so that a distribution state of the plurality of resources to the plurality of partitions becomes the optimum distribution state calculated by said calculation unit.

16. The non-transitory computer-readable recording medium on or in which a multi-processor system management program is recorded according to claim 15, wherein the program causes the computer to function such that, when the computer is caused to function as the calculation unit, the computer calculates an average distance regarding all of combinations of the plurality of resources allocated to the partitions based on the distance information of the first table and the data movement frequencies of the second table and selects a combination of those resources whose average distance is shortest as the optimum distribution.

17. The non-transitory computer-readable recording medium on or in which a multi-processor system management program is recorded according to claim 16, wherein a plurality of arithmetic processing sections and a plurality of memories are included as the plurality of resources; and the program causes the computer to function such that, when the computer is caused to function as the calculation unit, the computer calculates, for each of the combinations, a sum total of products between numbers of times of accessing of the arithmetic processing sections to the memories which are recorded as the data movement frequencies in the second table and corresponding memory latency defined as the distance information in the first table and calculates a value obtained by dividing the sum total of the products by a sum total of the numbers of times of accessing as the average distance regarding the relevant combination.

\* \* \* \* \*